Patented May 27, 1952

2,597,844

UNITED STATES PATENT OFFICE 2,597,844

PURIFYING SOAPS OF FATTY ACIDS

Sylvan R. Merley, Riverton, and August Kofoet, Bellmawr, N. J., assignors, by mesne assignments, to Cities Service Research and Development Company, New York, N. Y., a corporation of New Jersey No Drawing. Application November 24, 1948, Serial No. 61,900

4 Claims. (Cl. 260—413)

This invention relates to a method for soap purification and more particularly to a method for purifying water-insoluble soaps of fatty acids.

In processes for the production of fatty acids from high molecular weight petroleum fractions such as fuel oils, petrolatums, and paraffin wax, by means of controlled partial oxidation of the fraction, one method of separating the crude oxidized mixture into its constituents is to saponify the mixture with sodium hydroxide, thereby converting the acidic components of the crude product into sodium soaps. A large part of the unsaponifiables, plus unreacted starting materials, will form a separate layer in the saponifier, and may be withdrawn from the soap solution. This soap solution, however, will still contain considerable quantities of nonacidic materials such as alcohols, aldehydes, and ketones, which are undesirable impurities in wax acids to be used as starting materials in operations such as grease-making. One method for separating the acids from such undesirable components is to treat the soap solution with calcium chloride, whereby the sodium soaps are converted by the double decomposition into insoluble calcium soaps, which can be filtered from the solution, followed by a water wash of the soaps. This treatment does not yield a pure soap, since some nonacidic materials are always occluded by the calcium soaps even after thorough washing of the soap with water.

These nonacidic components may be removed by leaching the calcium soap with a solvent such as acetone, but it is very difficult to insure complete contact of the acetone with all of the soap, and the extraction of these undesired components is usually incomplete. This difficulty is due to the nature of the calcium soap, which is a more or less pasty material which cannot be conveniently ground or otherwise placed in such condition that a large surface area is exposed to the action of the acetone.

We have discovered, however, that this difficulty may be overcome almost in its entirety by mixing the soap with sufficient sand or other inert material to distribute the soap in an even, thin film over the surface of the sand, preferably at temperatures in excess of 180° F., at which temperature the calcium soaps are in semi-solid condition. This mixture of soap and sand, after cooling, may be easily comminuted, with the sand as a carrier for the soap. In this manner, an adequate surface is presented for the action of the acetone on the nonacidic components occluded by the soap. On placing the ground mass in a Soxhlet column and refluxing with acetone, the nonacidic materials may be easily leached out of the soap film, leaving the calcium soap in a highly purified form on the surface of the sand. The wax acids which are the desired product may then easily be recovered from the soap-sand mixture by treatment with hydrochloric acid.

In order that those skilled in the art may more fully understand our invention and the manner of carrying it out, the following example is given.

Example

One volume of a product of the partial oxidation of paraffin wax, having a neutralization number of 60 and a saponification number of 138, was dissolved in two and one-half volumes of boiling 91 per cent isopropyl alcohol, and sufficient 50° Bé. caustic soda was added to saponify the product, the caustic being added in small portions over a period of four hours boiling time. Four volumes, based on the volume of oxidation product, of hot water were then added, and boiling was continued for one hour. The mass was then allowed to settle into two layers. The upper layer was withdrawn, and upon analysis was found to contain 5.7 per cent by weight of unreacted wax, and 25.4 per cent by weight of nonacidic oxygenated compounds, both percentages being based on the weight of the sample of oxidation product taken as starting material.

The lower layer was then Engler distilled to remove the isopropyl alcohol as an overhead product, leaving an aqueous sodium soap solution. This solution was treated with a calcium chloride solution to precipitate the calcium soap of the wax acids present, and the calcium soaps were filtered from the solution. It was found that the filtrate from this operation was essentially free of oxygenated organic compounds, all impurities present being apparently preferentially soluble in or occluded by the calcium soaps. The soaps were then water washed to remove chlorides, and dried at 260–270° F.

The dried soaps, which at 270° F. are in a semi-molten condition, were then mixed with approximately five volumes of 8–14 mesh washed sand, and the mixture was cooled. After cooling, it was found that the mixture could be easily comminuted. The comminuted mixture appeared as free-flowing granules, each granule consisting of a grain of sand coated with a film of the calcium soap. The mixture was then placed in a Soxhlet column, and was acetone-extracted for one and one-half hours. It was found that 21.6 per cent by weight, based on the original oxidation product, of nonacidic oxygenated compounds, had been removed by the acetone extraction.

The soap-sand grit was removed from the Soxhlet column, mixed with boiling water, and acidified with hydrochloric acid to regenerate the wax acids from the calcium soap. Upon regeneration, the acids floated out as an upper layer, and were recovered by decantation. The wax acids thus recovered amounted to 48.2 per cent by weight of the original partial oxidation product, and were of a high degree of purity.

Our invention presents a solution to a problem which has been exceedingly troublesome in the manufacture of wax acids. It employs no expensive materials, and there is little loss of material in the process, since the sand, after the hydrochloric acid treatment, may be recovered in a clean, dry state, and the calcium chloride resulting from the hydrochloric acid treatment of the calcium soaps may be reused to precipitate calcium soaps from a new batch of aqueous sodium soap solution.

It should be understood, of course, that this invention is not limited to the purifying of calcium soaps of wax acids, but may equally well be applied to the purification of other soaps and other materials which are difficult to place in a physical condition in which they present a large surface area to a solvent.

Having now described our invention, what we claim is:

1. The method of purifying a calcium soap of wax acids including mixing an impure calcium soap of wax acids with a finely divided inert solid material in such relative proportions that the soap is spread in a thin layer over the surface of the solid material, comminuting the soap-solid mixture whereby to form a mass of free-flowing granules, contacting the granules with a solvent and leaching the impurities from the soap, separating the solvent containing dissolved impurities from the granules, and recovering a product consisting essentially of a purified soap mixed with the inert material.

2. The method of claim 1 in which the soap is mixed with the finely divided inert material in the proportion of about one volume of soap to five volumes of inert material.

3. The method of claim 2 in which the impurities contained in the impure calcium soap are nonacidic oxygenated organic compounds, and in which the solvent is acetone.

4. The method of claim 3 in which the mixing of the soap with the inert material is carried out at a temperature in excess of 180° F., and the mixture is cooled prior to comminution.

SYLVAN R. MERLEY.
AUGUST KOFOET.

REFERENCES CITED

The following references are of record in the file of this patent:

UNITED STATES PATENTS

| Number | Name | Date |
|---|---|---|
| 359,148 | Giebermann | Mar. 8, 1887 |
| 1,637,510 | Alleman | Aug. 2, 1927 |
| 2,132,997 | Plechner | Oct. 11, 1938 |
| 2,193,321 | Leithe | Mar. 12, 1940 |
| 2,279,408 | McDonald | Apr. 14, 1942 |